United States Patent [19]

Shields

[11] Patent Number: 4,870,396

[45] Date of Patent: Sep. 26, 1989

[54] AC ACTIVATED LIQUID CRYSTAL DISPLAY CELL EMPLOYING DUAL SWITCHING DEVICES

[75] Inventor: Steven E. Shields, San Diego, Calif.

[73] Assignee: Hughes Aircraft Company, Los Angeles, Calif.

[21] Appl. No.: 90,189

[22] Filed: Aug. 27, 1987

[51] Int. Cl.[4] ............................................. G09G 3/34
[52] U.S. Cl. .................................... 340/719; 340/784; 340/805
[58] Field of Search ............... 340/784, 718, 719, 805; 350/330, 332, 333

[56] References Cited

U.S. PATENT DOCUMENTS

| | | | |
|---|---|---|---|
| 3,862,360 | 1/1975 | Dill et al. | 178/7.3 D |
| 4,114,070 | 9/1978 | Asars | 340/719 |
| 4,149,151 | 4/1979 | Nagae et al. | 340/765 |
| 4,335,936 | 6/1982 | Nonomura et al. | 350/335 |
| 4,359,729 | 11/1982 | Nonomura et al. | 340/765 |
| 4,393,405 | 7/1983 | Ikeda | 358/153 |
| 4,429,305 | 1/1984 | Hosokawa et al. | 340/719 |
| 4,432,610 | 2/1984 | Kobayashi et al. | 350/331 R |
| 4,455,576 | 6/1984 | Hoshi | 358/230 |
| 4,471,347 | 9/1984 | Nakazawa et al. | 340/811 |
| 4,492,979 | 1/1985 | Ikeda | 358/153 |
| 4,496,977 | 1/1985 | Ikeda | 358/148 |
| 4,591,848 | 5/1986 | Morozumi et al. | 340/784 |
| 4,649,383 | 3/1987 | Takeda et al. | 340/805 |
| 4,651,149 | 3/1987 | Takeda et al. | 340/784 |
| 4,694,349 | 9/1987 | Takeda et al. | 340/784 |
| 4,710,768 | 12/1987 | Takeda et al. | 340/805 |

FOREIGN PATENT DOCUMENTS 2034953 6/1980 United Kingdom .

OTHER PUBLICATIONS

Japanese Patent Abstract No. 59-81621; vol. 8, No. 192; Suwa Seikosha K.K.; Yoshio Yamazaki.

*Primary Examiner*—Gerald L. Brigance
*Assistant Examiner*—M. Fatahiyar
*Attorney, Agent, or Firm*—Joseph E. Szabo

[57] ABSTRACT

An active matrix liquid crystal display cell for AC operation including a first field effect transistor switch for switching video information to a first storage capacitor and a second field effect transistor switch for switching the voltage of the first storage capacitor to one side of a liquid crystal cell. The second transistor is connected to be switched on by a common signal, for example, a vertical sync signal, and the top plate voltage applied to the liquid crystal cell is alternated in synchronism with the common signal, resulting in a doubling of the effective potential applied across the liquid crystal cell.

24 Claims, 3 Drawing Sheets

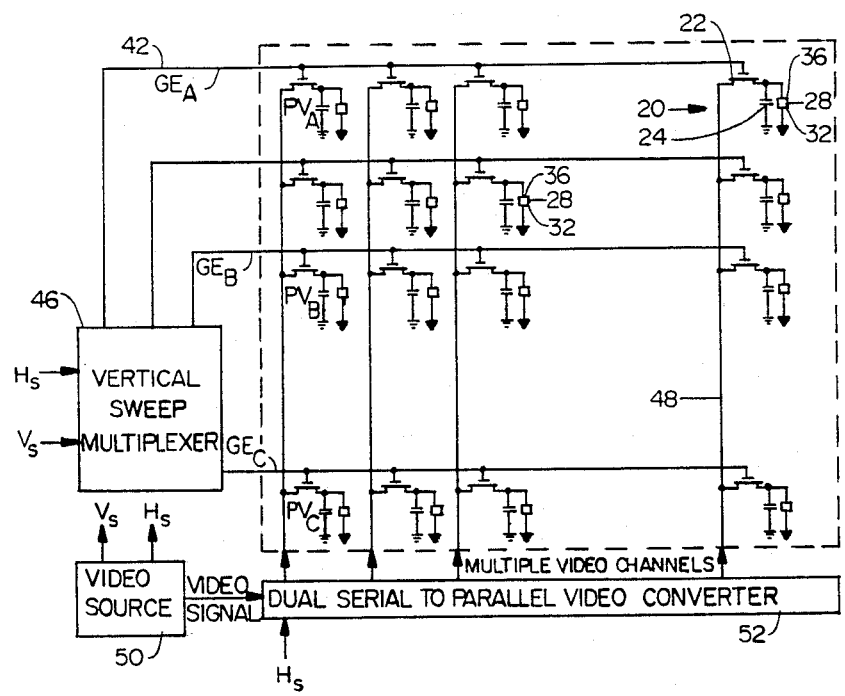
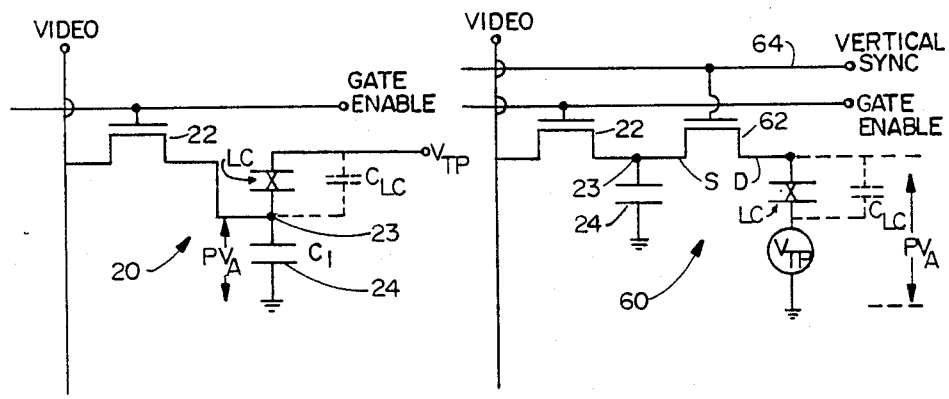
FIG. 1
(PRIOR ART)
FIG. 2
(PRIOR ART)
FIG. 4

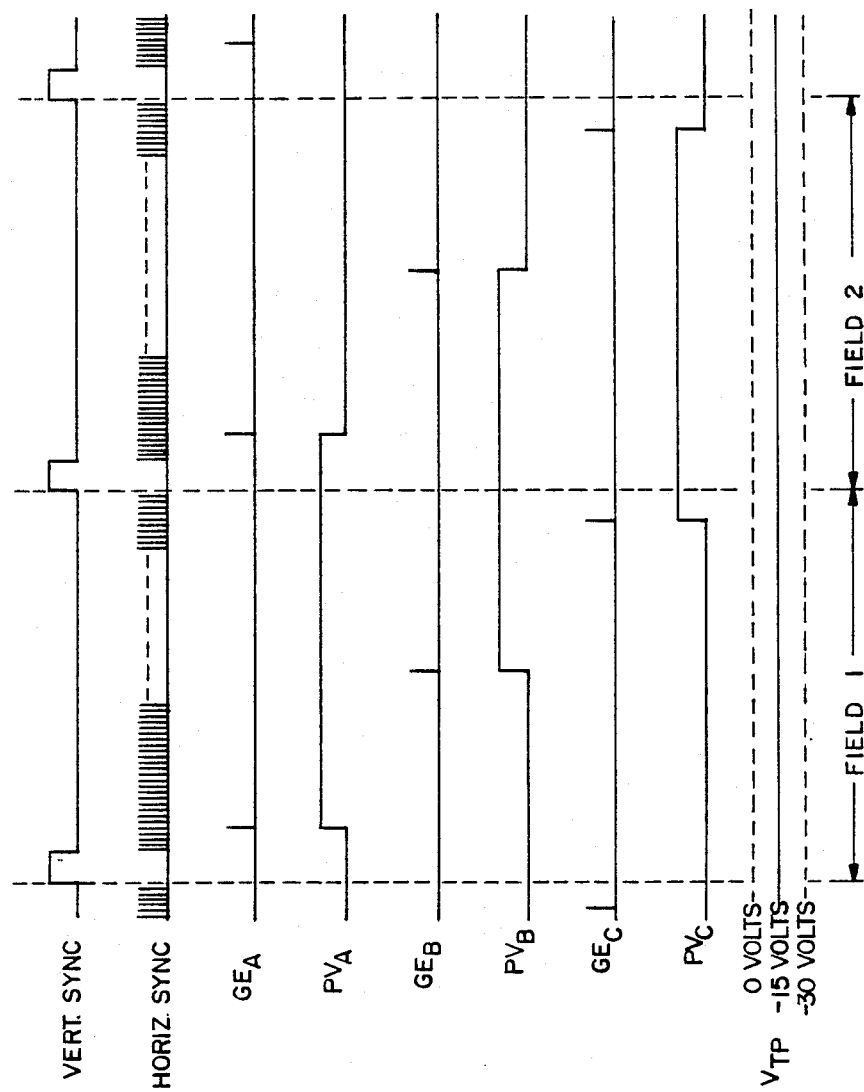

AC ACTIVATED LIQUID CRYSTAL DISPLAY CELL EMPLOYING DUAL SWITCHING DEVICES

BACKGROUND OF THE INVENTION

1. Field of the Invention

The subject invention relates to liquid crystal displays and more particularly to improved AC activation circuitry for an active matrix addressed liquid crystal display.

2. Description of Related Art

Presently, all active matrix addressed liquid crystal displays use AC activation. Present AC displays use one transistor per liquid crystal cell to switch a stored control voltage across the cell. Such structures achieve AC biasing of the liquid crystal cells by driving the pixel voltage symmetrically about a fixed potential which is applied to the top plate electrode. This AC drive technique limits the maximum applied RMS voltage to one-half of the available DC voltage range. Since the new information on each pixel appears immediately after that pixel is updated, it is impossible to switch the top plate potential in such a way that the effects are uniform for each pixel.

Limiting the applied RMS voltage to one-half the available DC voltage is disadvantageous because it restricts the liquid crystal effects which may be used with AC drive. For example, AC dynamic scattering liquid crystal materials cannot be driven by present drive structures. In addition, other scattering liquid crystal effects which incorporate encapsulated liquid crystal materials also require higher voltages than are presently available.

The long chain organic molecules of which liquid crystal materials are composed also can be degraded by various chemical contaminants. AC activated displays are more desirable than DC displays in this respect since the applied AC potential tends to limit electrochemical degradation of the liquid crystal material. It would therefore be desirable to continue use of AC activated displays, while eliminating the present limitations on the operating voltage of such displays.

It has occurred to the inventor that placement of additional transistors in the display cell structure might be used to eliminate the limitation on the operating voltage of the display cells in an AC activated display. Display cells with multiple transistors have been proposed in the prior art, generally to construct a static random access memory (RAM) cell. To the inventor's knowledge, additional transistors have not been proposed as part of a technique to extend the dynamic operating voltage of the liquid crystal cells.

SUMMARY OF THE INVENTION

It is therefore an object of the invention to improve liquid crystal displays;

It is another object of the invention to provide an improved structure for driving an AC activated liquid crystal display;

It is another object of the invention to increase the dynamic operating voltage of the liquid crystal cells in an AC activated display.

According to the invention, a display cell is provided which includes a first switch means used to switch a control voltage to a storage means and a second switch means activated by a second signal to apply the voltage stored by the storage means across the display cell. A matrix of such display cells is provided wherein the second switch means of each cell is activated in common by the second signal. The vertical sync signal is a convenient signal for use as the second signal, although another signal could be used. Use of the commonly activated plurality of second switch means permits the top plate voltage to be alternated, rather than remaining fixed as in the prior art. Alternation of the top plate voltage according to the invention permits doubling of the voltage applied to the liquid crystal material.

In one embodiment, the first and second switch means comprise first and second transistors, such as, for example, field effect transistors. By using the second transistors to switch the voltage on all of the pixels of the display in parallel, one can switch the voltage applied to the top plate of the display in concert with the switching of the pixel voltage. This allows the applied RMS voltage to equal the full DC voltage range as described in further detail herein.

BRIEF DESCRIPTION OF THE DRAWINGS

The just summarized invention will now be described in detail in conjunction with the drawings of which:

FIG. 1 is a schematic circuit diagram illustrating a prior art AC activated liquid crystal display;

FIG. 2 is a circuit diagram of a display cell of the prior art;

FIG. 3 is a timing diagram illustrating operation of a matrix of display cells wherein each cell is constructed as shown in FIG. 2;

FIG. 4 is a circuit diagram of the display cell of the preferred embodiment;

DETAILED DESCRIPTION OF THE PREFERRED EMBODIMENTS

Figure 5:
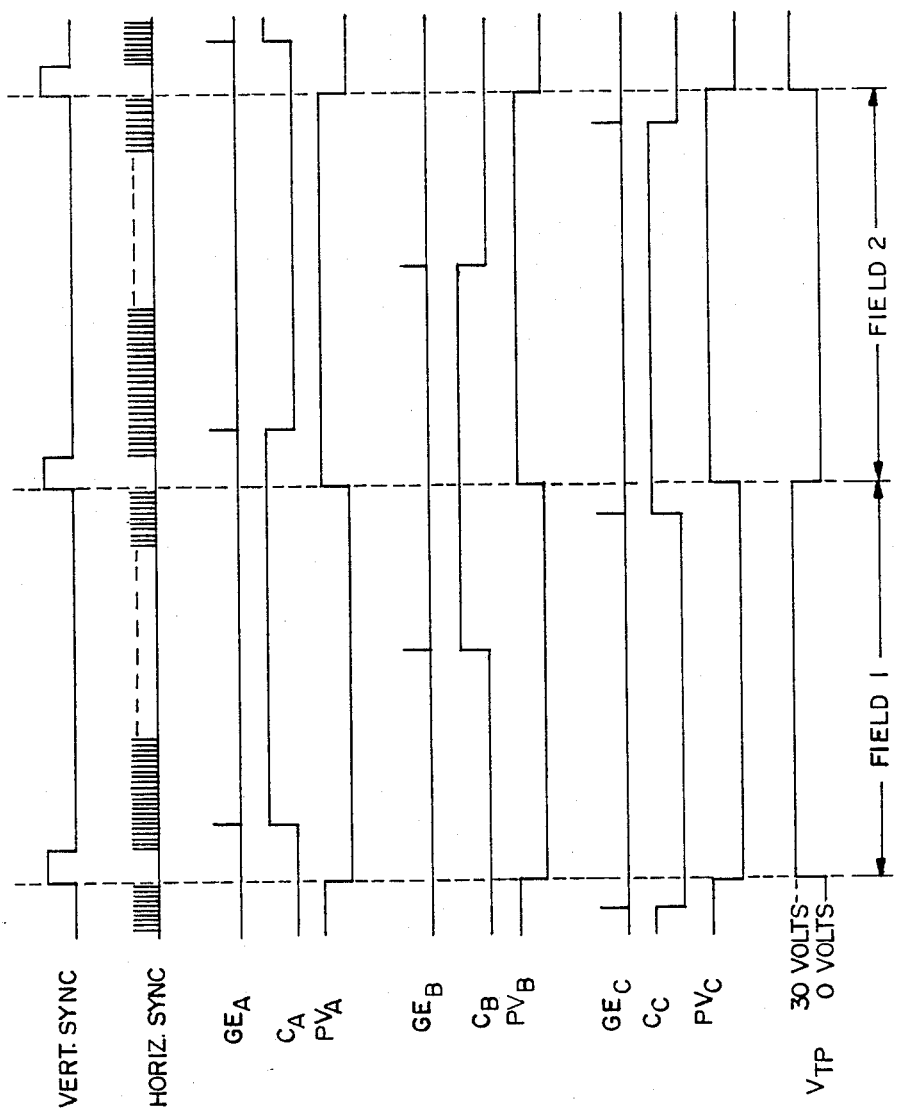
FIG. 5 is a timing diagram illustrating operation of an AC activated liquid crystal display employing display cells of the preferred embodiment.

FIG. 1 illustrates a typical prior art liquid crystal display panel configuration and addressing format which can be used for presenting conventional television type imagery.

In FIG. 1, the individual liquid crystal cells are arranged in a matrix of M rows and N columns. Each cell 20 employs liquid crystal material 28 sandwiched between a first transparent electrode 32 and a second reflective electrode 36. The transparent electrode 32 of each cell 20 is connected to a fixed reference voltage level as indicated by the arrowhead extending therefrom.

Each liquid crystal cell 20 also has associated therewith a field effect transistor (FET), which is designated generally by a reference numeral 22 and a capacitor which is designated generally by reference numeral 24. The transparent electrode 32 of each cell is typically formed as a transparent top plate electrode common to all cells.

The capacitor 24 and FET 22 form an elemental sample and hold circuit which functions to "stretch" addressing pulses, which could be 30 microseconds in duration, for example, to pulses of one millisecond duration needed to effectively energize the liquid crystal material. When the gate of a FET 22 is driven negative, the FET 22 turns "on" and the associated capacitor 24 is connected to a column electrode bus, such as column electrode bus 48, for example. Since the gates of all of the FETs 22 in any one row are connected together by a gate electrode bus, such as bus 42, for example, the placement of an enable signal on any given gate electrode bus causes all the storage capacitors 24 for that given row to be loaded with video data that is then present on their corresponding column electrode buses.

When the gate drive voltage is removed (the gate to drain voltage returns to zero or becomes positive), all of the capacitors 24 of the corresponding row are disconnected from the column bus by the high "off" resistance of the field effect transistors 22. In this manner, each of the capacitors 24 in any given column is separated from the other capacitors 24 in that column.

The synchronous line-at-a-time loading of new video information into all the elements in a given row of the display requires the video information to be present in parallel synchronous form on all the column electrode buses; i.e., the video cannot be scanned or switched from one column to the next because the video on all columns must be simultaneously valid and independent of video on the other columns.

It is noted that contrary to a conventional cathode ray tube system wherein each element is addressed by an electron beam that scans in two directions, the liquid crystal display addressing format of FIG. 1 permits scanning in only one direction. As shown in FIG. 1, a vertical sweep multiplexer 46 supplied with vertical and horizontal sync signals $V_s$, $H_s$ provides the ordered scan by driving the gate electrode buses, e.g. bus 42 with gate enable signals, e.g. $GE_A$, $GE_B$, $GE_C$. The multiplexer may be implemented by driving the gate electrode buses from the parallel outputs of a shift register, for example. The video signals are applied in the format required for conventional television scanning by means of a dual serial to parallel video converter 52. Additional details of such addressing circuitry are disclosed in U.S. Pat. No. 3,862,360, assigned to Hughes Aircraft Company.

Additional detail of a prior art active matrix cell 20 is shown in FIG. 2. As in FIG. 1, the cell 20 contains one transistor 22 and a storage capacitor 24. As in FIG. 1, the storage capacitor 24 stores a voltage $PV_A$ representing the applied video signal between refresh cycles. The ungrounded terminal 23 of the storage capacitor 24 connects the capacitor voltage $PV_A$ to one side of a liquid crystal cell LC, which has associated therewith a capacitance $C_{LC}$, shown in phantom in FIG. 2. The opposite side or top plate electrode of the liquid crystal cell LC is connected to a fixed top plate voltage $V_{TP}$.

FIG. 3 shows the timing of the signals of three isolated rows or lines A, B, C of a display such as that of FIG. 1, which are located at the beginning (top), middle, and end (bottom) of the display, respectively. The first line of FIG. 3 illustrates standard vertical sync pulses, which synchronize or time the provision of each successive frame of the display. On the second line of the timing diagram, below the vertical sync pulses are shown the horizontal sync pulses, each one of which synchronizes the activation of a particular row of the display during the vertical sync period by triggering generation of corresponding "Gate Enable" pulses for each of the rows of the display. Below the respective gate enable signals, Gate Enable A ($GE_A$), Gate Enable B ($GE_B$) and Gate Enable C ($GE_C$), the pixel voltage $PV_A$, $PV_B$, $PV_C$ is shown for each of the rows A, B, C, in the example under discussion. The respective pixel voltages $PV_A$, $PV_B$, $PV_C$ are each sampled and held by respective storage capacitors 24 at the beginning of application of the respective gate enable pulse $GE_A$, $GE_B$, $GE_C$. The top plate voltage $V_{TP}$ remains at a fixed level, $-15$ volts, throughout operation of the display.

From FIG. 3, it may be observed that there is no time at which the top plate voltage signal $V_{TP}$ could be changed symmetrically for all three of the rows A, B, C of the display to which the gate enable signals $GE_A$, $GE_B$, $GE_C$ are respectively applied. While the top plate is at $-15$ volts, the applied video signals $PV_A$, $PV_B$, $PV_C$ vary between 0 and $-30$ volts at different times. Thus, the display exhibits a maximum potential of 15 volts RMS across the liquid crystal LC.

The display cell 60 of the preferred embodiment of the invention is shown in FIG. 4. In this cell 60, a second field effect transistor 62 is added. This transistor 62 is located between the storage capacitor 24 of the FIG. 2 design and the liquid crystal element LC. The source of the second transistor 62 is connected to the capacitor terminal 23, and the drain D of the second transistor 62 is connected to the liquid crystal cell LC. The gate of the second transistor 62 is connected to a common line 64. The common top plate electrode of the liquid crystal element LC is connected to a voltage source $V_{TP}$ which provides an alternating voltage $V_{TP}$ as will be described in further detail in connection with FIG. 5. The liquid crystal element LC of FIG. 4 again has a capacitance $C_{LC}$ associated therewith.

It will be apparent that a display cell 60 may be substituted for each display cell 20 in a matrix structure such as that of FIG. 1. In a display such as that of FIG. 1, the gate of each second transistor 62 in each display cell is connected to a common line and is activated in common by, for example, the vertical sync signal.

The purpose of the second transistor 62 is to allow the charge stored on the first capacitor 24 to be transferred to the capacitance $C_{LC}$ associated with the liquid crystal element LC in parallel for all of the liquid crystal elements of the display. Thus, the first transistor 22 and the first capacitor 24 are used as in prior art displays to store the video information line by line, and the second transistor 62 and capacitance $C_{LC}$ of the liquid crystal cell are used to apply that stored information in parallel to the liquid crystal cells LC.

One requirement of this design is that the capacitance $C_1$ of the first capacitors 24 be much greater than the capacitance $C_{LC}$ of the liquid crystal cells LC, i.e. $C_1 >> C_{LC}$. This constraint limits the display cell size. Such a constraint might be overcome by adding additional capacitance through higher dielectric constant insulators or vertical integration of the capacitor. The capacitance associated with a 79 micron square liquid crystal element 10 microns thick is approximately 0.3 pF; the storage capacitance of one present LCMOS display layout (employing an approximately 45×55 micron capacitor with a 1400 angstrom thick $SiO_2$ dielectric) is approximately 7.5 pF, or 25 times larger than the calculated liquid crystal capacitance. Integration of the second transistor 62 would reduce this capacitance by approximately a factor of two or so, but would still permit a $C_1$ to $C_{LC}$ ratio of ten.

FIG. 5 shows the timing of the signals for three lines or rows A, B, C of a display which includes display cells according to the preferred embodiment. The diagram of FIG. 5 is similar to that of FIG. 3 in that the rows A, B and C are rows at the top, middle and bottom of a display as shown in FIG. 1. The vertical sync and horizontal sync signals shown are identical to those of FIG. 3, as are the gate enable signals, again illustrated as Gate Enable A (GE$_A$), Gate Enable B (GE$_B$) and Gate Enable C (GE$_C$).

Three new timing lines appear in FIG. 5, however, in order to show the presence of signals CA$_A$, C$_B$, C$_C$ stored respectively on the capacitors 24 of each display cell 60 of each row A, B, C of cells according to the preferred embodiment. Since the second transistors 62 of each display cell 60 are activated by the vertical sync signal, the respective pixel voltages PV$_A$, PV$_B$, PV$_C$ are established and applied at the same time, namely, the time of occurrence of the vertical sync signal. Thus, the voltage which is actually applied to the liquid crystal LC is now changed at the same moment for all of the rows of the display, including the three rows A, B, C. Thus, the top plate voltage V$_{TP}$ can be changed at the same moment as the voltage applied to the liquid crystal cells LC, resulting in symmetrical signals for all elements of the display. The top plate voltage V$_{TP}$ is therefore illustrated in FIG. 5 as being changed between 0 and −30 volts, and the line outputs again vary between 0 and −30 volts. This operation results in a theoretical 30v RMS signal for the liquid crystal matrix or twice the RMS signal level of the prior art. Losses in the charge transferred between capacitors will reduce this range somewhat.

An improved AC activated liquid crystal) display cell has thus been disclosed, which permits operation at approximately double the applied potential available in the prior art. Such operation greatly expands the number of liquid crystal effects which may be used in AC activated displays.

Those skilled in the art will appreciate that modifications and various adaptations of the just disclosed preferred embodiment can be made without departing from the scope and spirit of the invention. Therefore, it is to be understood that, within the scope of the appended claims, the invention may be practiced other than as specifically described herein.

What is claimed is:

1. A display cell for an AC activated liquid crystal display, said display cell including a liquid crystal cell responsive to a display signal to provide a portion of a display, and further comprising:
   a signal storage means for storing said display signal;
   a first switch means for switching said display signal to said signal storage means for storage thereby in response to a first control signal; and
   a second switch means for switching the display signal stored by said signal storage means to said liquid crystal cell in response to a second control signal.

2. The display cell of claim 1 wherein said second control signal is a vertical sync signal.

3. The display cell of claim 1 further including a control signal line means for applying said second control signal and wherein said second switch means comprises a transistor having a first terminal connected to said charge storage means, a second terminal connected to said liquid crystal cell and a third terminal connected to said control signal line means.

4. The display cell of claim 1 wherein said transistor comprises a first metal oxide silicon (MOS) transistor and wherein said first terminal comprises the source of said MOS transistor, said second terminal comprises the drain of said MOS transistor and said third terminal comprises the gate of said MOS transistor.

5. The display cell of claim 4 wherein said second control signal comprises a vertical sync signal.

6. The display cell of claim 5 wherein said first switch means comprises a second metal oxide silicon (MOS) transistor having a source connected to receive said display signal, a drain connected to said signal storage means and a gate connected to receive said first control signal.

7. The display cell of claim 6 wherein said signal storage means comprises a capacitor.

8. An AC activated liquid crystal display supplied with a common control signal comprising a plurality of rows of display cells, means for generating a plurality of successive enable signals prior to occurrence of said common control signal and for enabling each row to receive display signals in response to one of said enable signals, each display cell including:
   a liquid crystal cell activatable by a display signal;
   a signal storage means for storing said display signal;
   a first switch means for switching a display signal to said signal storage means in response to one of said enable signals; and
   a second switch means for switching the display signal stored by said signal storage means to said liquid crystal cell in response to said common control signal such that each liquid crystal cell in said plurality of rows of display cells activated simultaneously in response to said common control signal.

9. The display of claim 8 wherein all said liquid crystal cells share a common top electrode.

10. The display of claim 9 further including means supplying a top plate voltage to said common top electrode and for alternating the top voltage between first and second voltage levels.

11. The display of claim 10 wherein a plurality of said second switch means are connected to a common vertical sync control line supplying said common control signal.

12. The display of claim 10 wherein said means supplying said top plate voltage alternates said top plate voltage in synchronism with said common control signal.

13. The display of claim 12 wherein said common control signal is a vertical sync signal.

14. The display of claim 8 further including a control signal line means for applying said common control signal and wherein said second switch means comprises a transistor having a first terminal connected to said charge storage means, a second terminal connected to said liquid crystal cell and a third terminal connected to said control signal line means.

15. The display of claim 14 wherein said transistor comprises a first metal oxide silicon (MOS) transistor and wherein said first terminal comprises the source of said MOS transistor, said second terminal comprises the drain of said MOS transistor and said third terminal comprises the gate of said MOS transistor.

16. The display of claim 15 wherein said second control signal comprises a vertical sync signal.

17. The display of claim 16 wherein said first switch means comprises a second metal oxide silicon (MOS) transistor having a source connected to receive said display signal, a drain connected to said signal storage means and a gate connected to receive said first control signal.

18. The display of claim 17 wherein said signal storage means comprises a capacitor.

19. A display cell for an AC activated liquid crystal display, comprising:

a liquid crystal cell including liquid crystal material and an electrode mean for activating said material in response to application of a display signal;

a signal storage means for storing said display signal;

a first switch means for switching a display signal to said signal storage means in response to a first control signal; and a second switch means for switching the display signal stored by said signal storage means to said electrode means in response to a second control signal.

20. A liquid crystal display device comprising:

row and column electrodes defining a matrix of display cells, each display cell comprising:

a liquid crystal display element including liquid crystal material;

a signal storage means for storing a display signal;

a first switch means for switching a display signal from one of said column electrodes to said signal storage means for storage thereby in response to a first control signal; and a second switch means for switching the display signal stored by said signal storage means to said liquid crystal display element in response to a second control signal.

21. A method of controlling a liquid crystal display including a plurality of rows of liquid crystal display cells, each display cell activatable in response to application of a display signal, comprising the steps of:

storing display signals in said display, one display signal being stored for each of said liquid crystal display cells; and simultaneously applying a said display signal to each said liquid crystal display cell in said plurality of rows in response to a signal control signal.

22. The method of claim 21 wherein each display cell shares a common top plate electrode supplied with a top plate voltage, and further including the step of:

changing the top plate voltage supplied to said common top plate electrode in synchronism with the occurrence of said control signal.

23. The method of claim 22 wherein a plurality of sets of display signals are successively stored and successively applied, each set containing a display signal for each of said liquid crystal cells and being applied in response to a respective one of a succession of common control signals and wherein said top plate voltage is successively alternated in synchronism with the occurrence of said common control signals.

24. A display cell for an AC activated liquid crystal display, said display cell including a liquid crystal cell for activation by a display signal and further comprising:

a signal storage means for storing said display signal;

a first switch means for switching said display signal to said signal storage means in response to a first control signal, said first switch means including a first field effect transistor having a drain connected to said signal storage means; and a second switch means for applying the display signal stored by said signal storage means to one of said liquid crystal cells in response to a second control signal, said second switch means including a second field effect transistor having a source connected to the drain of said first field effect transistor.

* * * * *